Dec. 24, 1968  M. GOLAY  3,417,779
SELECTABLE CONCENTRATION GAS MIXING APPARATUS
Filed Jan. 9, 1967  2 Sheets-Sheet 1
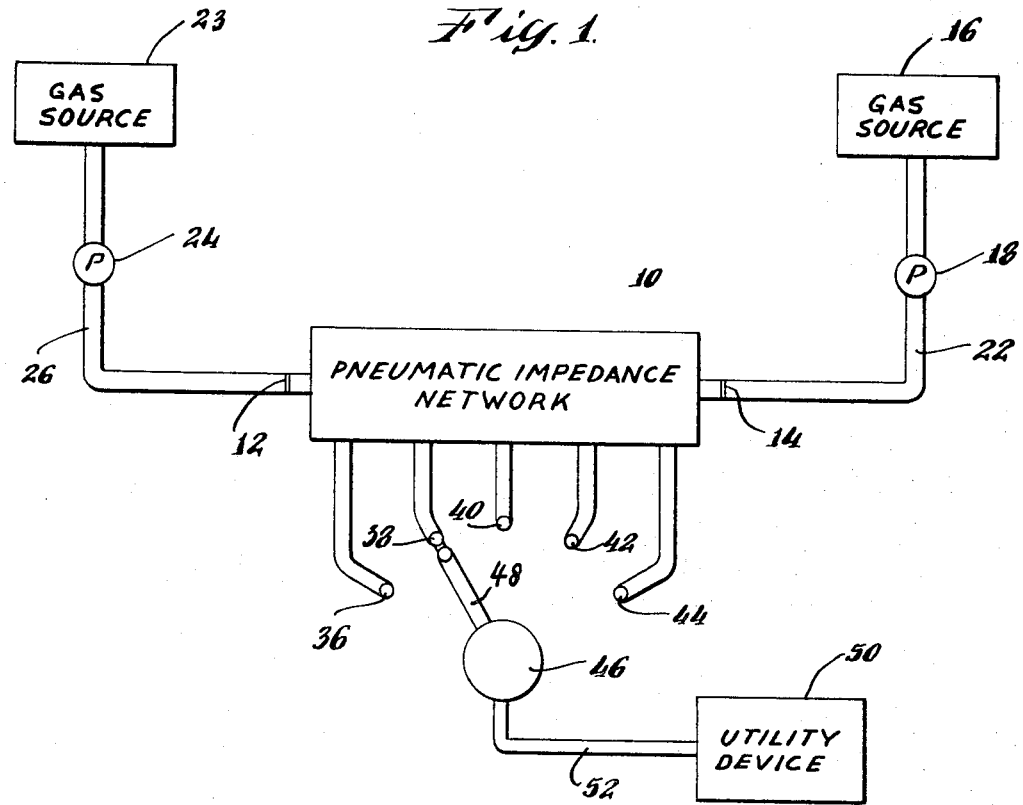
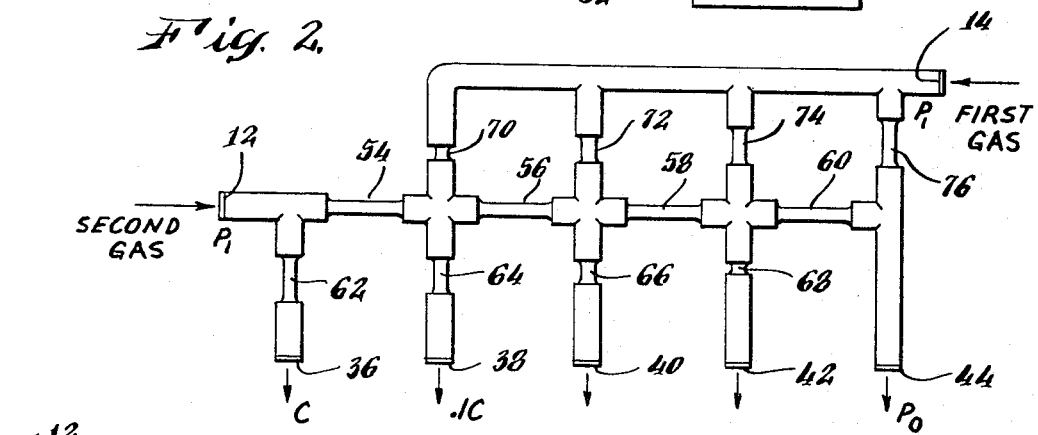
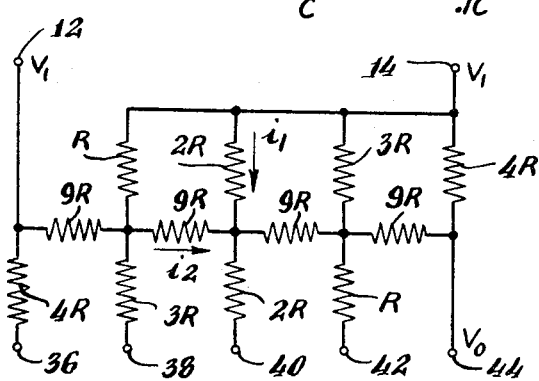
INVENTOR.
Marcel Golay
BY
Frank J. Thompson
ATTORNEY.

INVENTOR.
Marcel Golay
BY
ATTORNEY

United States Patent Office

3,417,779
Patented Dec. 24, 1968

3,417,779
SELECTABLE CONCENTRATION GAS
MIXING APPARATUS
Marcel Golay, Rumson, N.J., assignor to The Perkin-Elmer Corporation, Norwalk, Conn., a corporation of New York
Filed Jan. 9, 1967, Ser. No. 607,942
10 Claims. (Cl. 137—604)

ABSTRACT OF THE DISCLOSURE

A network of fluid flow impedances is employed for mixing different flowing fluids to provide a plurality of predetermined output fluid mixtures.

---

This invention relates generally to apparatus for combining flowing fluids to provide a plurality of predetermined resultant mixtures. The invention also relates to apparatus for providing a plurality of preselectable concentrations of a component fluid in a flowing carrier fluid.

In various systems and apparatus, the need exists for accurately combining flowing fluids to provide a plurality of predetermined resultant fluid mixtures. More particularly, it is desirable to provide a mixture of a flowing carrier fluid and a component fluid in which the concentration of the component fluid in the carrier fluid can be accurately altered with facility. For example, in gas chromatographic apparatus a vaporized sample is introduced into a flowing carrier gas stream and transported by the gas through components of the apparatus including a separating column and a detector. It is advantageous during the post-fabrication testing of such apparatus to provide a means for accurately varying the concentration in order that the operation of the components may be determined over a range of concentrations. Additionally, means of this character are advantageous in the laboratory for calibrating chromatographic detectors.

It is an object of the present invention to provide an apparatus adapted for mixing flowing fluids and for accurately providing a plurality of predetermined different mixtures.

Another object of the present invention is to provide an apparatus adapted for mixing a flowing carrier gas with a component fluid and for accurately providing different predetermined concentrations of the component fluid in the carrier gas.

A further object of the invention is to provide an apparatus adapted for supplying a mixture of a flowing carrier gas and a component fluid and wherein the carrier-component concentration can be readily selected from one of a plurality of preestablished values.

In accordance with the general features of the present invention, first and second fluids are conducted from respective sources to a fluid flow impedance mixing network. The network is arranged to provide a plurality of flowing output fluid mixtures.

In accordance with more particular features of the present invention, a carrier fluid flows from a source to a means for introducing a component fluid into the carrier stream. The carrier fluid also flows from the source to one inlet port of a fluid flow impedance mixing network while the mixture from the fluid introducing means flows to a second inlet port of the network. The impedance network includes a plurality of flow restrictors arranged in a manner for diluting the mixture introduced to the first port with the carrier fluid introduced at the second port and for providing at a plurality of output ports thereof, a corresponding plurality of flowing mixtures of predetermined concentration. Means are also provided for selectively coupling a utility apparatus to a one of the output ports.

These and other objects and features of the invention will become apparent from the following specification and drawings wherein:

FIGURE 1 is a diagram of an apparatus embodying the present invention and shown partially in block form;

FIGURE 2 is a diagram illustrating a fluid flow impedance network employed with the apparatus of FIGURE 1;

FIGURE 3 is an electrical impedance network illustrating the analogous electrical arrangement of the network of FIGURE 2 and useful for explaining the operation of the network;

Figure 4:
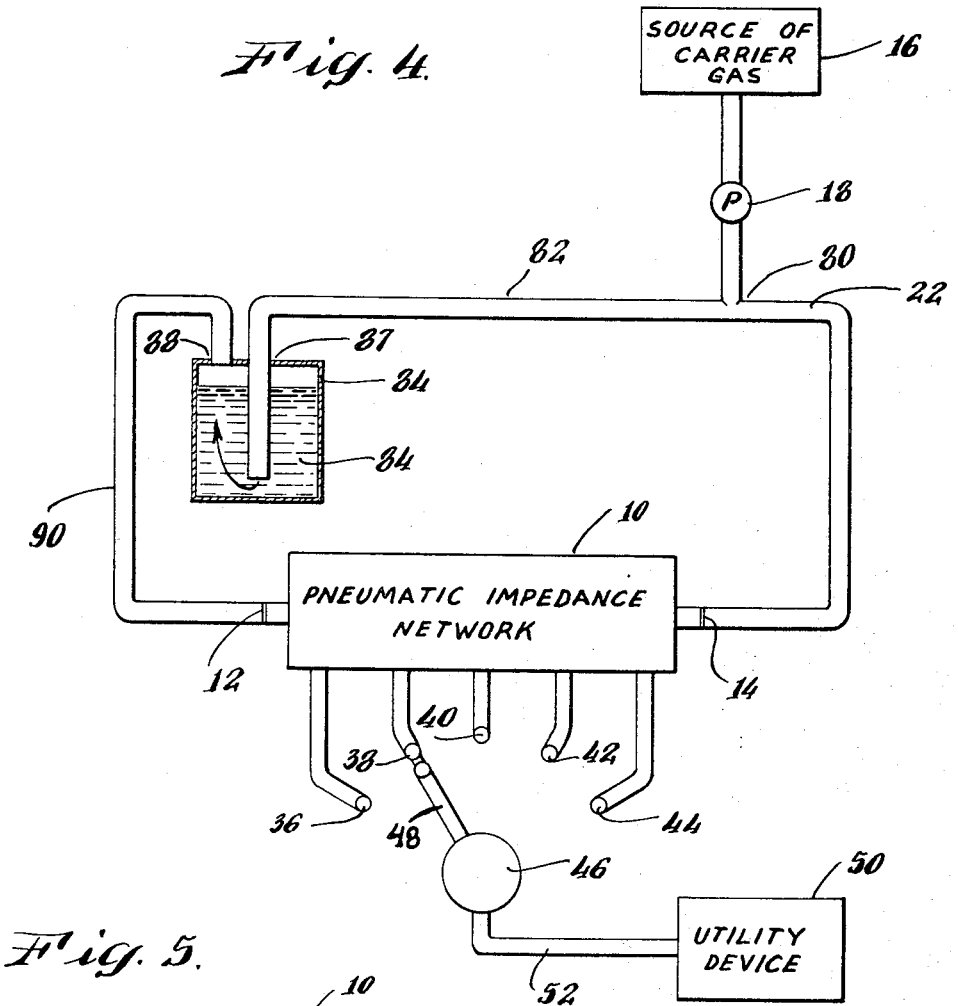
FIGURE 4 is a diagram partially in block form of another apparatus embodying an alternative arrangement of the present invention.

In FIGURE 1, a pneumatic impedance network is illustrated generally as 10 and includes inlet ports 12 and 14. For the purpose of this specification and the accompanying claims, the expression pneumatic impedance refers to impedances which present impedances to the flow of both liquid and gaseous fluids. For instance, a first gaseous fluid derived from a first source 16 is conducted to port 14 via a pressure regulator 18 and conduit selection 22. A second gaseous fluid which is to be mixed with the first gas is derived from source 23 and conducted to port 12 of the network through pressure regulator 24, a flow control valve (not shown), and conduit 26. The impedance network 10 includes a plurality of outlet ports 36, 38, 40, 42 and 44. As indicated hereinafter in greater detail, a mixture of the inlet gases elutes from each of these outlet ports. The concentrations of the input gases in eluting mixtures will differ in accordance with the arrangement of the impedance network. A valve 46, having means for switching between the different outlet ports of the network and including the rotary segment 48, is adapted to be manually operated and to conduct the gaseous mixture from a one of these ports to a utility device 50 via a conduit 52. The effluent from the nonselected ports is exhausted to atmosphere.

In FIGURE 2, the pneumatic impedance network 10 is illustrated in detail. The pneumatic impedance network comprises a plurality of flow restrictors intercoupled by tubulation and arranged in a manner for combining the gases introduced at the inlet ports to provide eluting gaseous mixtures of different predetermined concentrations at the outlet ports. Although the flow restrictors in FIGURE 2 are shown to be capillary sections bearing the reference numerals 54 through 76, other forms of flow restrictors may be used. For example, sand-packed or glass bead-packed tubes may be employed to provide the effective pneumatic impedance provided by the capillary sections of FIGURE 2. The lengths of the capillary sections, although not drawn to scale, are indicative of the relative flow impedance provided by the sections. For example, if it is desired that the output concentrations vary by a factor of 10, then in a particular decade arrangement the restrictors 54, 56, 58, and 60 have a relative impedance of 9R where R represents a unit of impedance; the restrictors 62 and 76 provide an impedance of 4R; the restrictors 64 and 74 provide an impedance of 3R; the restrictors 66 and 72 provide an impedance of 2R; and the restrictors 68 and 70 provide an impedance of 1R. Under these conditions, the concentration at output ports 36, 38, 40, 42 and 44 are respectively C, .1 C, .01 C, .001 C, and .0001 C, where C represents the concentration of the first gas in the second, in gas source 23.

When dealing with gaseous flow, analogizing between pneumatic and electrical circuits is useful since it permits the immediate translation of known results from electrical circuits into pneumatic circuits. This analogy will be established in what follows.

It is well known that the pneumatic resistance R of a tube of length $l$ and diameter $r$ is given by the expression:

$$R = 8\eta l / \pi r^4$$

where $\eta$ designates the viscosity of the gas which, as long as the dimensions of the tube are large when compared with the mean free path of the molecules, is independent of the gas pressure.

It is also well known that throughout a pneumatic resistance at one end of which there is a pressure $P_1$ higher than the pressure $P_0$ which obtains at the other end, the product FP, i.e., flow in cm.$^3$ sec.$^{-1}$ times pressure in gr. cm.$^{-1}$ sec.$^{-2}$ is an invariant throughout said pneumatic resistance and is given by the expression:

$$FP = \frac{P_1^2 - P_0^2}{2R}$$

and that R may be considered as an invariant for all viscous flows, i.e., for all flows exhibiting no turbulence. It is, therefore, indicated that the half squared pressure $P^2/2$ will be analogous to voltage in an electrical circuit and that the invariant mass flow FP is analogous to current in said resistance.

When dealing with liquid flows, the analogy of voltage in current will be more nearly the pressure P and the flow F since liquid compressibility can be considered as negligible in most applications. In what follows it will be assumed that we are dealing with gas flow although the results obtained will be equally correct for liquid flow as far as the passive characteristics of the network are concerned.

FIGURE 3 which is the electrical analogy of this pneumatic arrangement illustrates the analogous manner in which the mixing of the gases is represented by a combination of electrical currents to provide the desired output concentrations. The regulators 18 and 24 are adjusted to provide at inlets 12 and 14 equal pressure. Under these conditions, the pressure at terminal 12 and at terminal 14 are substantially equal and are represented as $P_1$. The voltages analogous to the pressure $P_0$ of the flowing mixtures at the outlet ports 36, 38, 40, 42 and 44 are equal and represented as $V_0$. The voltage drop across each of the resistances which are analogous to the restrictors and which each have an impedance value of 9R is $$\frac{V_1 - V_0}{4}$$

Accordingly, the voltage at the junction of resistances analogous to restrictors 56 and 58, for example, is $$\frac{V_1 + V_0}{2}$$

The analogy of the carrier gas mass flowing in restrictor 72 is indicated in FIGURE 3 as the current $i_1$ and the gas flowing in the restrictor 56 is indicated as the current $i_2$. The ratio of the currents $i_1/i_2$ represents the ratio of the gases flowing through restrictor 60 and is given by:

$$\frac{i_1}{i_2} = \frac{(V_1 - V_0)/4R}{(V_1 - V_0)/36R} = \frac{9}{1}$$

Thus, a ratio of 9:1 is provided and the relative concentration at port 40 is .01 C since the concentration in 56 was .1 C. Similar calculations can be made for determining the concentrations at the other ports.

Various other pneumatic impedance networks may be employed in the apparatus of the present invention. For example, although the flowing mixtures having concentrations which differ by factors of 10 are provided, other desired output concentrations can be provided by suitably selecting the impedance values of the network flow restrictors. The network may additionally be modified to include a greater or fewer number impedance restrictors in providing desired outlet concentrations. Flow rates are chosen to avoid any undesired affects such as back diffusion. Further, it is advantageous at times to provide additional volumes, such as chambers, at the junction of the impedance elements in order to improve the mixing characteristics of the apparatus at various flow rates.

FIGURE 4 illustrates an arrangement for introducing a fluid into a carrier gas stream. Elements performing a similar function as related elements in FIGURE 1 are identified in FIGURE 4 by the same reference numerals. A carrier gas derived from the source 16 is typically an inert gas such as nitrogen or helium. The carrier gas in introduced directly to the port 14. In addition, a mixture of the carrier gas and a component fluid is introduced to the network 10 at port 12. As shown in FIGURE 4, the carrier gas flows from the source via a T junction 80 and a conduit 82 to a reservoir 84 which contains a component fluid 86. Carrier gases enter the reservoir 84 at an inlet port 87 and flow through the fluid to an outlet port 88. A mixture of carrier gas and the component fluid having a concentration C, flows from the outlet port 88 and via a conduit 90 to the impedance network 10. Mixing of the gases occurs in the same manner as indicated hereinbefore with respect to FIGURE 1.

Figure 5:
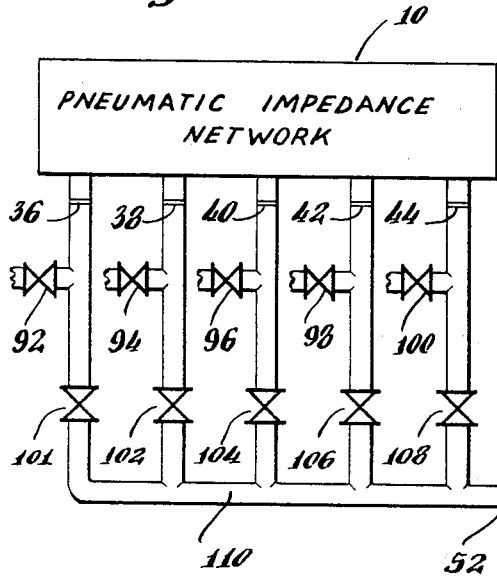
FIGURE 5 is a diagram partially in block form illustrating an alternative outlet valving arrangement for use with the apparatus of FIGURES 1 and 4.

An alternative valving arrangement for switching the outlet ports and utility device is illustrated in FIGURE 5. Each of the outlet ports is coupled to a conduit which is coupled to a common conduit section 110. An on-off venting valve and an on-off flow interruption valve is employed with each conduit section as shown. The venting valves 92, 94, 96, 98 and 100 vent to outlet ports to atmosphere or other pressure $P_0$ while the flow interruption valves 101, 102, 104, 106 and 108 couple a desired outlet port to the conduit 52. In operation the venting and flow interruption valves for a selected outlet port are respectively closed to atmosphere and open to conduit 110. The nonrelated venting and flow interruption valves are respectively open to atmosphere and closed to the conduit 110.

Figure 6:
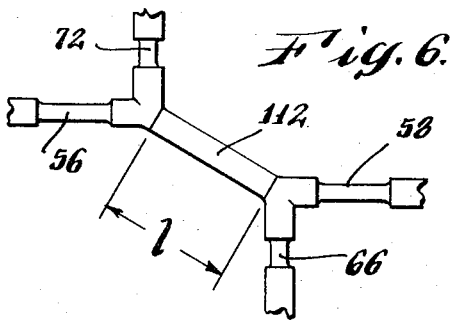
FIGURE 6 is a view of a portion of the network of FIGURE 2 modified to include an additional mixing volume.

It is advantageous at times to provide additional mixing volumes, such as tubular segments at the junction of the impedance elements in order to improve the mixing characteristics of the apparatus at various flow rates. FIGURE 6 illustrates the inclusion of a tubular mixing volume 112 at the junction of network impedance elements 56, 58, 66 and 72. The mixing tubulation has a length L and a cross sectional areas S. The length of mixing volume L is determined from the following considerations. It is assumed that a carrier gas component flows through the venter 72 and a component which is to be injected flows into the carrier stream from the venter 56. The flow of carrier is given by:

$$F \approx \Delta P r^4 / l_1 \mu$$

where constant factors have been neglected, and where

F is the flow rate of carrier,
$\Delta P$ is the pressure drop across venter 72,
$r$ is the radius of the venter 72, and
$l_1$ is the length of the venter 72.

The period of time $T_p$ that a molcule is in the mixing volume of length L is:

$$T_p = L \cdot S / F$$

The time ($T_d$) required for diffusion of any molecule in the tube of area S is of the order:

$$(T_d) \approx S/D$$

where D is the diffusion constant.

For proper mixing we should have:

$$(T_p) > (T_d)$$

Accordingly $$LS/F > S/D$$

and $$L > F/D \sim \Delta P r^4 / D l_1 \mu$$

when $\Delta P \approx 1$ atmosphere, then atmosphere $$\Delta P\ (1) \sim \rho v^2$$

where $\rho$ = gas density
$v$ = molecule velocity
$D \approx v \cdot e$
$\mu \approx p \cdot v \cdot e$ where $e$ represents the mean free path of a molecule.

Thus, $$\frac{\Delta P}{D \cdot \mu} \approx \frac{\rho \cdot v^2}{(v \cdot e)} (\rho \cdot v \cdot e) \approx \frac{1}{e^2}$$

$$L > \Delta P r^4 / D l_1 \mu$$

$$L > r^4 / e^2 l_1$$

The derivation of the expressions for the length of the cross-section of the mixing volume are given precisely for a stream splitting arrangement in a chromatographic column in the "Nature," volume 209, page 502, Jan. 29, 1966.

An arrangement has thus been described for providing a plurality of predetermined mixtures of flowing fluids and for selectably utilizing a desired one of the mixtures.

While I have illustrated and described a particular embodiment of my invention, it will be understood that various modifications may be made therein without departing from the spirit of the invention and the scope of the appended claims.

I claim:
1. Apparatus for mixing flowing fluids comprising:
    a source of a first fluid at elevated pressure;
    a source of a second fluid at elevated pressure;
    a pneumatic impedance network having first and second inlet ports for receiving said first and second fluids and a plurality of outlet ports, said network adapted for mixing fluids of different concentrations and for producing at each of said outlet ports a mixture of said fluids of differing concentrations; and
    conduit means for conveying said first and second fluids from said sources to said first and second inlet ports respectively.
2. The apparatus of claim 1 wherein said network is adapted for mixing said fluids in a manner for diluting said first fluid with said second fluid.
3. The apparatus of claim 2 including means for selectively coupling the outlet ports of said network to a utility device.
4. The apparatus of claim 2 wherein said network includes a plurality of flow restrictive impedance elements having impedance values and intercoupled in a manner for providing outlet fluid concentrations which differ by a factor of 10.
5. Apparatus for providing a mixture of carrier gas and component fluid comprising:
    a source of carrier gas;
    a pneumatic impedance network having first and second inlet ports for receiving fluids of first and second differing concentrations and a plurality of output ports, said network adapted for mixing the fluids of different concentrations and for providing at each of said output ports fluids having different concentrations;
    means for conveying a gaseous fluid of first concentration to said first input port; and
    means for conveying a gaseous fluid of a second different concentration to said second input port.
6. The apparatus of claim 5 including means for selectively coupling the output ports of said networks to a utility device.
7. Apparatus for providing a mixture of carrier gas and component fluid comprising:
    a source of carrier gas;
    a pneumatic impedance network having first and second input ports and a plurality of output ports, said network including a plurality of flow restrictors arranged in a manner for mixing fluid inputs at said first and second inputs ports and for providing at said output ports mixtures of different concentrations;
    means for conveying said carrier gas to a first of said input ports;
    a flow through sample introduction means having input and output ports and adapted for mixing a fluid component with a carrier gas flowing therethrough;
    means for conveying said carrier gas from said source to the input port of said sample mixing means;
    means for conveying the mixture from the output port of said sample mixing means to said network input port; and
    means for selectively coupling the output port of said network to a utility device.
8. The apparatus of claim 7 wherein said flow restrictors comprise a plurality of tubulations including capillary segments.
9. The apparatus of claim 8 wherein said selective coupling means comprises a valve adapted for individually coupling a one of the said network output ports to the utility device.
10. The apparatus of claim 9 wherein said sample mixing means comprises a gas saturator.

References Cited

UNITED STATES PATENTS

| | | | |
|---|---|---|---|
| 2,509,042 | 5/1950 | McIlroy | 137—597 X |
| 2,600,877 | 6/1952 | Jeffree | 137—604 X |
| 2,821,210 | 1/1958 | Liley | 137—599 |
| 2,934,448 | 4/1960 | Patton | 137—604 X |
| 3,115,158 | 12/1963 | Sheppard | 137—604 X |
| 3,290,019 | 12/1966 | Ducharme | 261—23 |

STANLEY N. GILREATH, *Primary Examiner.*

U.S. Cl. X.R.

137—597; 239—398; 261—23; 55—386; 73—23.1